(12) United States Patent
Ando

(10) Patent No.: US 11,087,498 B2
(45) Date of Patent: Aug. 10, 2021

(54) IMAGE PROCESSING SYSTEM, OPTICAL SENSOR, AND LEARNING APPARATUS WITH IRREGULAR LENS ARRAY

(71) Applicant: OMRON Corporation, Kyoto (JP)

(72) Inventor: Tanichi Ando, Komaki (JP)

(73) Assignee: OMRON Corporation, Kyoto (JP)

( * ) Notice: Subject to any disclaimer, the term of this patent is extended or adjusted under 35 U.S.C. 154(b) by 54 days.

(21) Appl. No.: 16/478,867

(22) PCT Filed: Mar. 9, 2017

(86) PCT No.: PCT/JP2017/009537
§ 371 (c)(1),
(2) Date: Jul. 18, 2019

(87) PCT Pub. No.: WO2018/142634
PCT Pub. Date: Aug. 9, 2018

(65) Prior Publication Data
US 2019/0378304 A1    Dec. 12, 2019

(30) Foreign Application Priority Data
Feb. 1, 2017  (JP) .............................. JP2017-016385

(51) Int. Cl.
*H04N 5/225* (2006.01)
*G06T 7/00* (2017.01)
*G02B 3/00* (2006.01)

(52) U.S. Cl.
CPC .............. *G06T 7/97* (2017.01); *G02B 3/0056* (2013.01); *H04N 5/2254* (2013.01);
(Continued)

(58) Field of Classification Search
CPC .................................................... G02B 3/0056
See application file for complete search history.

(56) References Cited

U.S. PATENT DOCUMENTS

| 7,566,855 B2 * | 7/2009 | Olsen ................ H01L 27/14625 |
| | | 250/208.1 |
| 10,416,454 B2 * | 9/2019 | Schmidtlin .......... G02B 3/0062 |

(Continued)

FOREIGN PATENT DOCUMENTS

| CN | 102256836 A | 11/2011 |
| CN | 106303228 A | 1/2017 |

(Continued)

OTHER PUBLICATIONS

The Office Action dated Jun. 22, 2020 in a counterpart Chinese patent application.

(Continued)

*Primary Examiner* — Gary C Vieaux
(74) *Attorney, Agent, or Firm* — Metrolex IP Law Group, PLLC

(57) ABSTRACT

An image processing system according to an aspect of the invention includes: an optical sensor including: an optical member configured to refract light from a subject, the optical member including a plurality of transmissive units that have different optical properties, thus forming different refraction patterns of light that passes therethrough; and a plurality of image sensors configured to receive light that has passed through the transmissive units and to form captured images in which the subject appears; and an information processing apparatus configured to calculate attribute information representing an attribute of the subject by inputting the captured images obtained by the image sensors to a learning device that has learned the attribute of the subject.

15 Claims, 10 Drawing Sheets

(52) U.S. Cl.
CPC . *H04N 5/2258* (2013.01); *G06T 2207/20081* (2013.01); *G06T 2207/20084* (2013.01)

(56) References Cited

U.S. PATENT DOCUMENTS

| | | | | |
|---|---|---|---|---|
| 2010/0171866 A1* | 7/2010 | Brady | ................... | H04N 5/2254 348/340 |
| 2011/0149125 A1* | 6/2011 | Morimoto | ............ | H04N 5/3456 348/272 |
| 2011/0221599 A1 | 9/2011 | Högasten | | |
| 2011/0253917 A1 | 10/2011 | Rothenhaeusler | | |
| 2012/0050562 A1* | 3/2012 | Perwass | ................ | H04N 5/2254 348/222.1 |
| 2014/0253760 A1* | 9/2014 | Watanabe | .......... | H04N 5/23232 348/239 |

FOREIGN PATENT DOCUMENTS

| | | |
|---|---|---|
| JP | 2011-77764 A | 4/2011 |
| JP | 2012-514796 A | 6/2012 |
| JP | 2012-525028 A | 10/2012 |
| JP | 2015-188251 A | 10/2015 |
| JP | 2016-45170 A | 4/2016 |
| JP | 2016-184956 A | 10/2016 |
| WO | 2010/078563 A1 | 7/2010 |
| WO | 2010/121637 A1 | 10/2010 |
| WO | 2018/024006 A1 | 2/2018 |

OTHER PUBLICATIONS

The extended European search report dated Mar. 10, 2020 in a counterpart European patent application.

The Japanese Office Action (JPOA) dated Nov. 12 2019 in a counterpart Japanese patent application.

An English translation of the International Search Report("ISR") of PCT/JP2017/009537 dated May 30, 2017.

The Written Opinion("WO") of PCT/JP2017/009537 dated May 30, 2017.

The International Preliminary Report on Patentability (Chapter II of the Patent Cooperation Treaty) of PCT/JP2017/009537 dated Jan. 11, 2019.

The Japanese Office Action (JPOA) dated Apr. 7, 2020 in a counterpart Japanese patent application.

* cited by examiner

IMAGE PROCESSING SYSTEM, OPTICAL SENSOR, AND LEARNING APPARATUS WITH IRREGULAR LENS ARRAY

TECHNICAL FIELD

The present invention relates to an image processing system, an optical sensor, and a learning apparatus.

RELATED ART

Patent Document 1 proposes an image processing apparatus that acquires an image using an optical sensor that uses a microlens array and a plurality of photoelectric transducers, and extracts a feature region where a characteristic subject appears from the image through machine learning using the acquired image as input data. With this image processing apparatus, a highly accurate multidimensional image can be obtained by extracting image information representing a model that corresponds to the feature region from a model database, which stores image information representing a plurality of types of models for a predetermined characteristic subject, the image information being more accurate than a multidimensional image, and generating composite image information regarding the feature region.

Patent Document 2 proposes an image processing apparatus that acquires an image using an optical sensor that uses a microlens array and a plurality of photoelectric transducers, and divides the acquired image into a first divided region for acquiring distance information and a second divided region for generating a refocused image based on the distance information. With this image processing apparatus, when driven to display a live view image, an image in which a wide area is brought into focus can be displayed while reducing a reconstruction processing load.

RELATED ART DOCUMENTS

Patent Documents

Patent Document 1: JP 2011-077764A
Patent Document 2: JP 2016-184956A

SUMMARY OF THE INVENTION

Problem to be Solved by the Invention

If a microlens array is used, as in Patent Documents 1 and 2, a significant change can be made to images obtained by image sensors that receive light converged by the respective microlenses, in association with a slight physical change in shooting conditions, such as the position, direction, and orientation of a subject. Thus, images obtained using the microlens array make it possible to readily identify a slight physical change occurring in the shooting conditions.

The present inventors, however, have found that the following problems may occur in the case of the conventional methods of identifying an attribute of a subject (note that an "attribute" refers to a certain property, such as the position, orientation, shape, size, color, or type of the subject, that may be characteristic of a subject) using a microlens array. That is to say, microlenses in a conventional microlens array are configured uniformly. Specifically, all of the microlenses have the same optical properties, and have a relatively large converging angle.

For this reason, basically, the entire subject appears in a low-resolution state in the images obtained through the microlenses. Moreover, there is only a difference corresponding to the position of each microlens between the images, which are therefore substantially the same. It is, therefore, difficult to identify the type of the subject itself based on the images obtained through the microlenses, and particularly to distinguish one object from another object of the same category.

Meanwhile, if the converging angle of the microlenses is reduced, portions of a subject that correspond to the positions of the respective microlenses appear in a high-resolution state in the images obtained through the microlenses. Thus, the type of the subject may be able to be identified by integrating the obtained images. In this case, however, the entire subject does not appear in the obtained images, and it may then be difficult to grasp a slight physical change in the position, direction, orientation, or the like of the object.

Thus, the inventors have found that the conventional method of identifying an attribute of a subject using a microlens array makes it possible to focus on a specific attribute of the subject to facilitate identification thereof, but it is difficult for this method to enable a variety of attributes of the subject to be identified.

In one aspect, the present invention has been made in view of the foregoing situation, and aims to provide technology that enables a variety of attributes of a subject to be identified.

Means for Solving the Problems

To solve the above-stated object, the invention employs the following configurations.

That is to say, an image processing system according to an aspect of the invention includes: an optical sensor including: an optical member configured to refract light from a subject, the optical member including a plurality of transmissive units that have different optical properties, thus forming different refraction patterns of light that passes therethrough; and a plurality of image sensors configured to receive light that has passed through the transmissive units and to form captured images (image data) in which the subject appears, the plurality of image sensors being provided in correspondence with the transmissive units; and an information processing apparatus configured to acquire attribute information representing an attribute of the subject by inputting the captured images obtained by the image sensors to a trained learning device that has been trained to determine the attribute of the subject.

In the above configuration, the optical member is used to capture images of a subject, the optical member including a plurality of transmissive units that have different optical properties, thus forming different refraction patterns of light that passes therethrough. Due to this configuration, the subject appears in the captured images obtained by the image sensors in a state where different optical properties are reflected in these images. That is to say, the entire subject appears in a low-resolution state in captured images obtained through transmissive units with a relatively large converging angle, and a portion of the subject appears in a high-resolution state in captured images obtained through transmissive units with a relatively small converging angle. Accordingly, according to the above configuration, a plurality of captured images suitable for analyzing a plurality of different attributes of the subject can be obtained, and therefore, an image processing system can be provided that is capable of identifying a variety of attributes of the subject based on the plurality of captured images obtained.

Note that, in the above configuration, there is a possibility that the captured images obtained by the image sensors are not recognizable for a person as a result of different optical properties of the transmissive units being reflected therein (e.g. the degree to which light converges may differ between the transmissive units). In the above configuration, however, the captured images are used as the input to the learning device with which machine learning for determining specific attribute information has been performed, and therefore, the captured images do not need to be recognizable for a person.

Also, according to the above configuration, a variety of captured images of one subject can be obtained. For example, a captured image that captures a wide area of a subject and a captured image that captures a portion of the subject in detail can be acquired, as will be described later. Then, by performing learning, which is typified by classification, clustering, feature value extraction, or the like, using the captured images acquired, the accuracy of recognizing other subjects pertaining to the same category as the aforementioned subject can be increased, i.e. a robust learning device can be constructed.

In the image processing system according to the above aspect, the learning device may be constituted by a learning device that is trained using a neural network, a support vector machine, a self-organizing map, or reinforcement learning. According to this configuration, an image processing system capable of identifying a variety of attributes of a subject can be readily realized.

In the image processing system according to the above aspect, the plurality of transmissive units in the optical member may include a first transmissive unit that is arranged at a center and has a predetermined first converging angle, and second transmissive units that are arranged around the first transmissive unit and have a second converging angle that is greater than the first converging angle of the first transmissive unit. According to this configuration, an image processing system can be provided that is capable of readily identifying the type of a subject that is present in front of the optical sensor, and is capable of readily grasping a physical change in a subject that is present at a position away from the front of the optical sensor.

In the image processing system according to the above aspect, the first converging angle may be 2.0 degrees at most, and the second converging angle may be at least 20 degrees. According to this configuration, an image processing system can be provided that is capable of identifying the type of a subject that is present in front of the optical sensor, and is capable of grasping a physical change in a subject that is present at a position away from the front of the optical sensor.

In the image processing system according to the above aspect, the optical properties of the transmissive units are irregular. This configuration makes it possible to obtain a plurality of captured images in which a variety of optical properties are reflected, and thus, a variety of attributes of a subject can be identified based on the captured images obtained.

In the image processing system according to the above aspect, the optical member may include at least one of a lens array including a plurality of lenses, a diffraction grating, a scattering lens, and a holographic lens. According to this configuration, an image processing system capable of identifying a variety of attributes of a subject can be readily realized.

In the image processing system according to the above aspect, the optical member may include a lens array including a plurality of lenses as the plurality of transmissive units, and the optical properties of the transmissive units may be realized by at least one of a size, a material, a shape, and a color of the lenses. In a lens array, optical properties of the lenses can be readily differentiated. Accordingly, according to this configuration, an image processing system capable of identifying a variety of attributes of a subject can be realized at low cost. Note that the lens array is a microlens array, for example. However, the size of each lens is not limited to the microscale, and may be selected as appropriate, depending on the embodiment.

In the image processing system according to the above aspect, the information processing apparatus may output, as the attribute information, one of, or a combination of, a position, a direction, an orientation, a size, a shape, a motion, a type, individual identification information, a color, a brightness, and environmental information of the subject. According to this configuration, an image processing system can be provided that analyzes at least one of the position, direction, orientation, size, shape, motion, type, individual identification information, color, brightness, and environmental information of the subject.

In the image processing system according to the above aspect, the information processing apparatus may create an image depicting the subject based on output from the learning device, and output the created image as the attribute information. According to this configuration, an image processing system can be provided that outputs an image in which an attribute of a subject is reflected.

An optical sensor according to an aspect of the invention includes: an optical member configured to refract light from a subject, the optical member including a plurality of transmissive units that have different optical properties, thus forming different refraction patterns of light that passes therethrough; and a plurality of image sensors configured to receive light that has passed through the transmissive units and to form captured images in which the subject appears, the plurality of image sensors being provided in correspondence with the transmissive units.

In the optical sensor according to the above aspect, the plurality of transmissive units in the optical member may include a first transmissive unit that is arranged at a center and has a predetermined first converging angle, and second transmissive units that are arranged around the first transmissive unit and have a second converging angle that is greater than the first converging angle of the first transmissive unit.

In the optical sensor according to the above aspect, the first converging angle may be 2.0 degrees at most, and the second converging angle may be at least 20 degrees.

In the optical sensor according to the above aspect, the optical properties of the transmissive units are irregular.

In the optical sensor according to the above aspect, the optical member may include at least one of a lens array including a plurality of lenses, a diffraction grating, a scattering lens, and a holographic lens.

In the optical sensor according to the above aspect, the optical member may include a lens array including a plurality of lenses as the plurality of transmissive units, and the optical properties of the transmissive units may be realized by at least one of a size, a material, a shape, and a color of the lenses.

A learning apparatus according to an aspect of the invention includes: a learning image acquisition unit configured to acquire the captured images captured by the image sensors from the optical sensor according to any of the above modes; and a learning processing unit configured to train a learning device to output attribute information regarding the subject if the acquired captured images are input.

In the learning apparatus according to the above aspect, the learning processing unit may train the learning device to output, as the attribute information, one of, or a combination of, a position, a direction, an orientation, a size, a shape, a motion, a type, individual identification information, a color, a brightness, and environmental information of the subject, and an image depicting the subject.

Effects of the Invention

According to the invention, technology that enables a variety of attributes of a subject to be identified can be provided.

EMBODIMENTS OF THE INVENTION

An embodiment according to an aspect of the invention (referred to also as "the present embodiment" below) will be described below based on the drawings. However, the present embodiment described below is merely an example of the invention in all respects. Needless to say, various improvements and modifications can be made without departing from the scope of the invention. That is to say, when the invention is carried out, a specific configuration appropriate for an embodiment may also be employed as appropriate. Although data that appears in the present embodiment is described using natural language, more specifically, the data is designated by quasi-language, commands, parameters, machine language, or the like that is recognizable for a computer.

§ 1 Example Application

Figure 1:
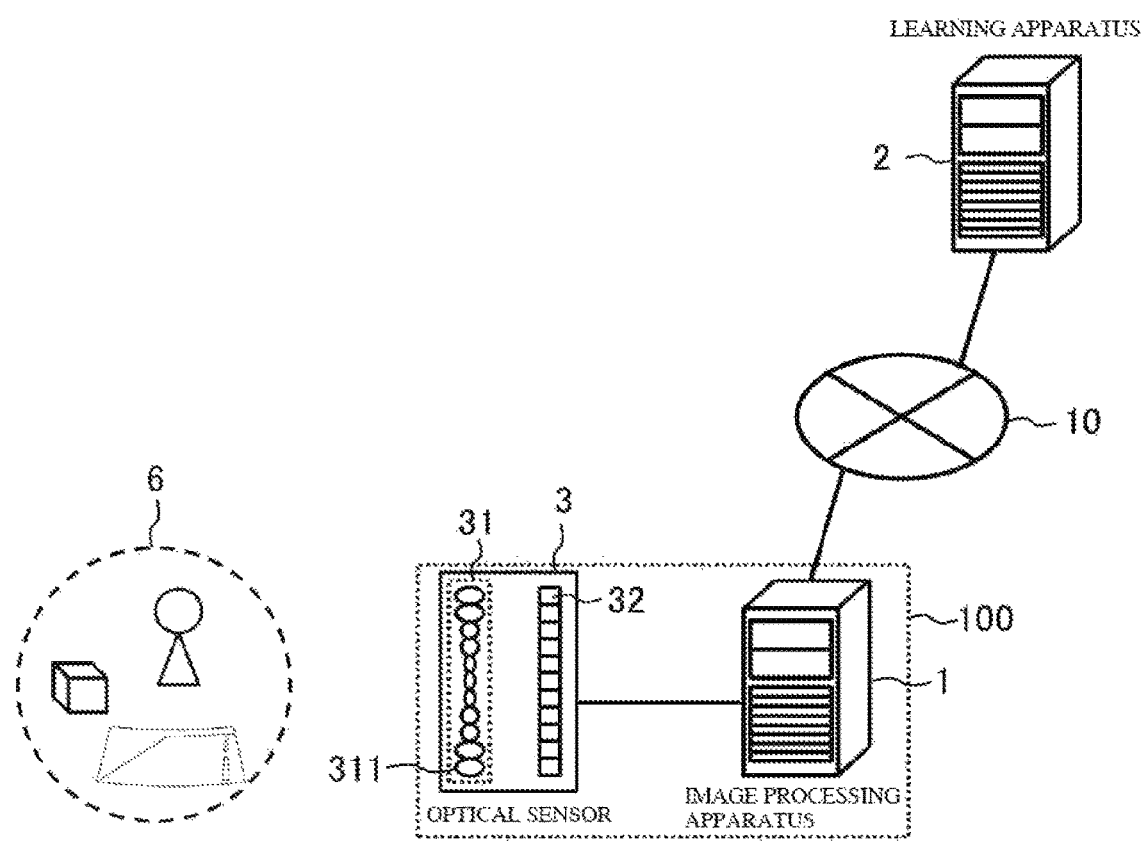
FIG. 1 schematically shows an example of a scenario where an image processing system and a learning apparatus according to an embodiment are applied.

First, an example of a scenario where the invention is applied will be described with reference to FIG. 1. FIG. 1 schematically shows an example of a scenario where an image processing system 100 and a learning apparatus 2 according to the present embodiment are applied. The image processing system 100 according to the present embodiment is an information processing system that analyzes attributes of a (photographic) subject 6 using a learning device (which is a later-described neural network 7) that has learned the attributes of the subject 6.

As shown in FIG. 1, the image processing system 100 includes an optical sensor 3 for capturing images of subjects 6, and an image processing apparatus 1 for specifying attributes of the subjects using the captured images obtained by the optical sensor 3. The optical sensor 3 includes a lens array 31, which includes a plurality of lenses 311, and a plurality of image sensors 32, which are provided in correspondence with the respective lenses 311 and receive light that has passed through the lenses 311 to form captured images of the subject 6. The lens array 31 is an example of an "optical member" of the invention. The lenses 311 are an example of "transmissive units" of the invention. The subjects 6 may be anything whose images can be captured using the optical sensor 3, and may be, for example, a scene such as a situation outside a vehicle, a product that is manufactured in a manufacturing line, or a predetermined object such as a person. Note that the lens array 31 is a microlens array, for example. However, the size of each of the lenses 311 is not limited to the microscale, and may be selected as appropriate, depending on the embodiment.

The plurality of lens 311 have different optical properties, and thus have different refraction patterns of light that passes therethrough. With this configuration, the image sensors 32 in the optical sensor 3 form captured images that reflect the different optical properties of the respective lenses 311. The image processing apparatus 1 acquires attribute information representing attributes of the subject 6 by inputting the captured images obtained by these image sensors 32 to the learning device that has learned the attributes of the subject 6.

Meanwhile, the learning apparatus 2 according to the present embodiment is a computer that constructs the learning device to be used by the image processing system 100, i.e. causes the learning device to perform machine learning so as to output attributes of the subject 6 in accordance with the plurality of captured images obtained by the optical sensor 3 being input. Specifically, the learning apparatus 2 acquires the images captured by the image sensors 32 from the optical sensor 3. The learning apparatus 2 then trains the learning device (which is a later-described neural network 8) to output attributes of the subject 6 if the acquired captured images are input to the learning device.

Thus, the trained learning device to be used in the image processing system 100 is created. The image processing apparatus 1 can acquire the trained learning device created by the learning apparatus 2, via the network 10, for example. Note that the type of the network 10 may be selected from, for example, the Internet, a wireless communication network, a mobile communication network, a telephone network, a dedicated network, or the like, as appropriate.

As described above, in the present embodiment, the lens array 31 is used to capture images of the subject 6, the lens array 31 including the plurality of lenses 311 that have different optical properties and thus have different refraction patterns of light that has passed therethrough. Due to this configuration, the subject 6 appears in the captured images obtained by the image sensors 32 in a state where different optical properties are reflected in these images. Accordingly, according to the present embodiment, a plurality of captured images suitable for analyzing a plurality of different attributes of the subject 6 can be obtained, and therefore, a variety of attributes of the subject 6 can be identified based on the plurality of captured images obtained.

If a conventional microlens array, in which all microlenses have the same converging pattern, is used as the lens array 31, the captured images obtained by the image sensors will be similar to each other. For this reason, if learning, which is typified by classification, clustering, and feature value extraction, or the like, is performed using such acquired captured images, the accuracy of recognizing a subject itself used in the learning improves, but there is a limit to the increase in the accuracy of recognizing other subjects pertaining to the same category as this subject.

In contrast, with the method according to the present embodiment, a variety of captured images of a specific subject 6 in which different optical properties are reflected can be acquired by using the lens array 31 that includes the plurality of lenses 311 with different optical properties. Then, by performing learning, which is typified by classification, clustering, feature value extraction, or the like, using these captured images acquired, the accuracy of recognizing other subjects pertaining to the same category as the aforementioned subject can be increased, i.e. robust machine learning can be realized.

§ 2 Example Configuration

Hardware Configuration

Image Processing Apparatus

Figure 2:
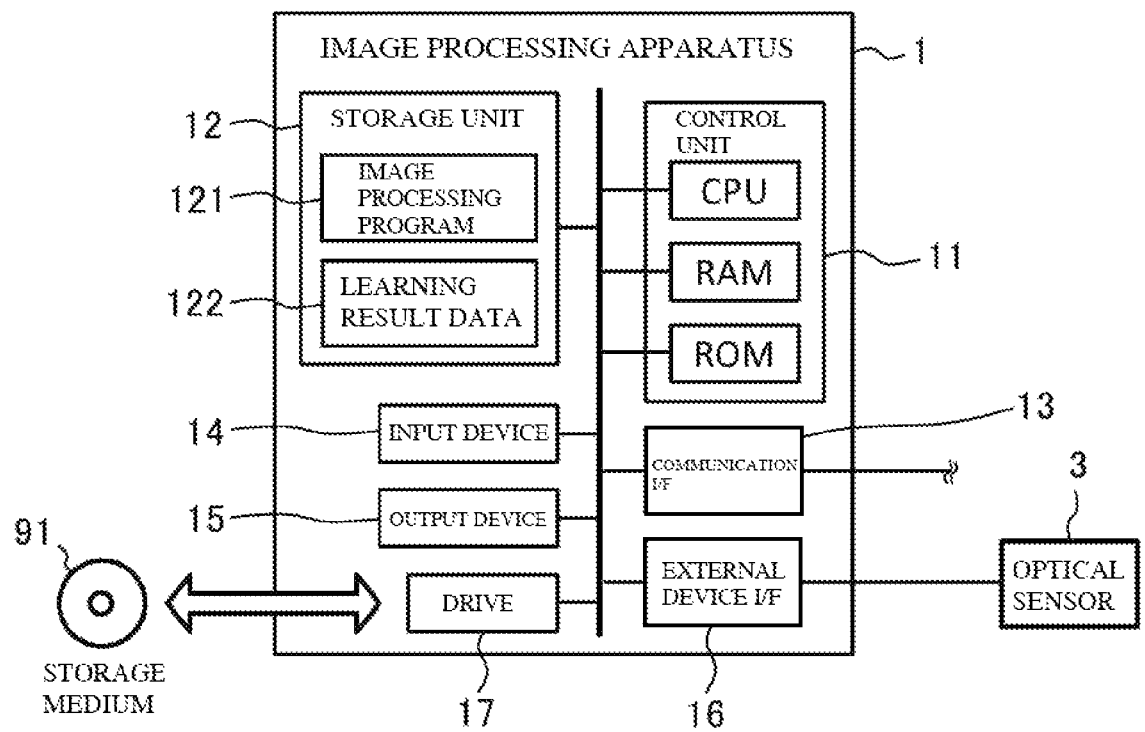
FIG. 2 schematically shows an example of a hardware configuration of an image processing apparatus according to an embodiment.

Next, an example of a hardware configuration of the image processing apparatus 1 according to the present embodiment will be described with reference to FIG. 2. FIG. 2 schematically shows an example of the hardware configuration of the image processing apparatus 1 according to the present embodiment.

As shown in FIG. 2, the image processing apparatus 1 according to the present embodiment is a computer in which a control unit 11, a storage unit 12, a communication interface 13, an input device 14, an output device 15, an external device interface 16, and a drive 17 are electrically connected to each other. The image processing apparatus 1 according to the present embodiment corresponds to an "information processing apparatus" of the invention. Note that, in FIG. 2, the communication interface and the external device interface are denoted as a "communication I/F" and an "external device I/F", respectively.

The control unit 11 includes a CPU (Central Processing Unit), a RAM (Random Access Memory), a ROM (Read Only Memory), and so on, and controls constituent elements in accordance with information processing. The storage unit 12 is, for example, an auxiliary storage device such as a hard disk drive or a solid state drive, and stores an image processing program 121, which is executed by the control unit 11, learning result data 122, which represents information regarding a trained learning device, and so on.

The image processing program 121 is a program for causing the image processing apparatus 1 to perform later-described processing (FIG. 7) to analyze attributes of the subject 6. The learning result data 122 is data for configuring settings of a trained learning device. The details thereof will be described later.

The communication interface 13 is, for example, a wired LAN (Local Area Network) module, a wireless LAN module, or the like, and is an interface for performing wired or wireless communication via a network. The input device 14 is, for example, a device for making input, such as a mouse or a keyboard. The output device 15 is, for example, a device for making output, such as a display or a speaker. The external device interface 16 is a USB (Universal Serial But) port or the like, and is an interface for connecting to an external device, such as the optical sensor 3.

The drive 17 is, for example, a CD (Compact Disk) drive, a DVD (Digital Versatile Disk) drive, or the like, and is a device for loading a program stored in a storage medium 91. The type of the drive 17 may be selected as appropriate, depending on the type of the storage medium 91. The aforementioned image processing program 121 and/or the learning result data 122 may also be stored in this storage medium 91.

The storage medium 91 is a medium for storing information such as a program through an electric, magnetic, optical, mechanical, or chemical effect, such that computers, other devices, machines, or the like can read recorded information such as the program. The image processing apparatus 1 may also acquire the image processing program 121 and/or the learning result data 122 from this storage medium 91.

Here, FIG. 2 shows a disk-type storage medium such as a CD or a DVD as an example of the storage medium 91. However, the type of the storage medium 91 is not limited to the disk type, and may also be a type other than the disk type. Examples of a storage medium of a type other than the disk type may include a semiconductor memory, such as a flash memory.

Note that, as for the specific hardware configuration of the image processing apparatus 1, constituent elements may be omitted, replaced, or added as appropriate, depending on the embodiment. For example, the control unit 11 may also include a plurality of processors. The image processing apparatus 1 may also be constituted by a plurality of information processing apparatuses. The image processing apparatus 1 may be not only an information processing apparatus that is dedicated for a service provided, but also a general-purpose desktop PC (Personal Computer), a tablet PC, or the like.

Optical Sensor

Figure 3A:
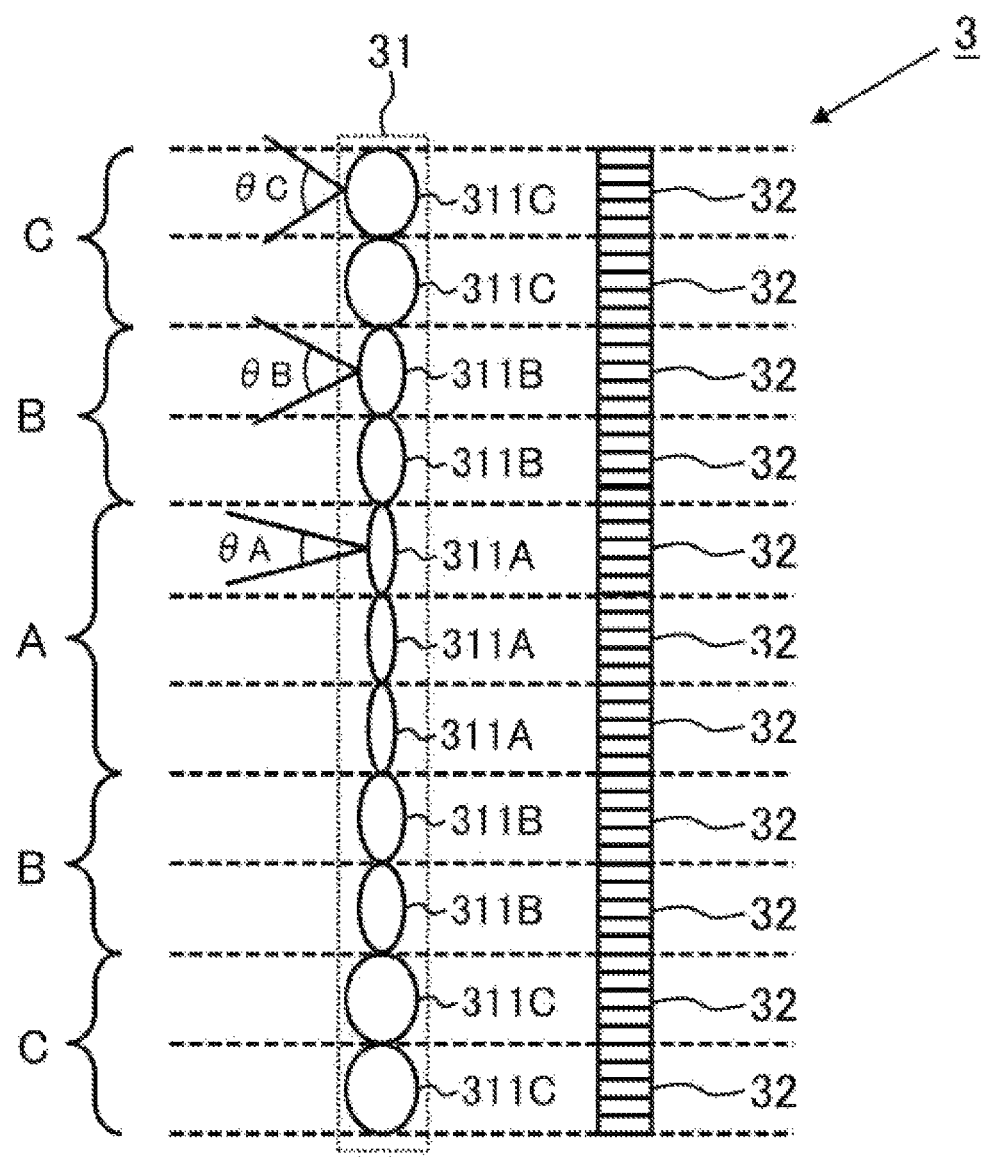
FIG. 3A schematically shows an example of a configuration of an optical sensor according to an embodiment.
Figure 3B:
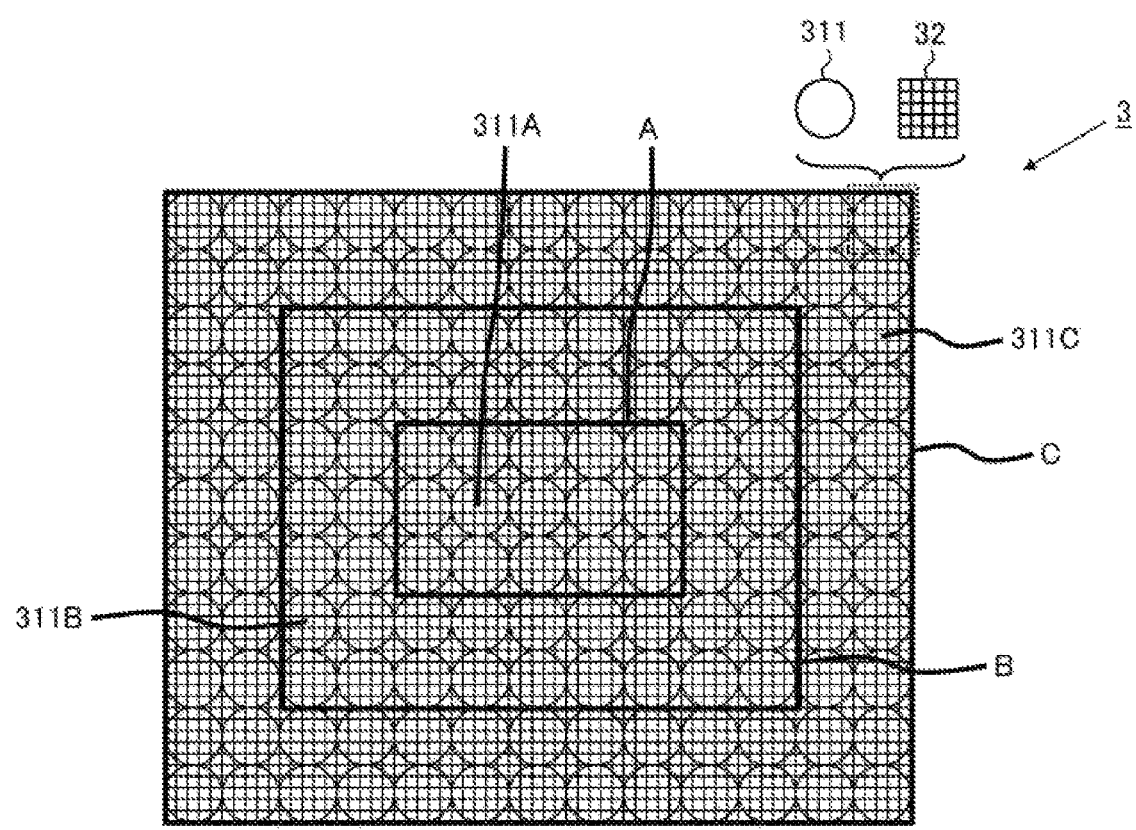
FIG. 3B schematically shows an example of a configuration of the optical sensor according to an embodiment.

Next, an example of a configuration of the optical sensor 3 according to the present embodiment will be described with reference to FIGS. 3A and 3B. FIG. 3A schematically shows an example of a state where the optical sensor 3 according to the present embodiment is seen from the side. FIG. 3B schematically shows an example of a state where the optical sensor 3 according to the present embodiment is seen from the front.

As shown in FIGS. 3A and 3B, the optical sensor 3 according to the present embodiment includes the lens array 31, which includes 11×13 lenses 311, and 11×13 image sensors 32, which are arranged in correspondence with the respective lenses 311.

Each of the image sensors 32 is constituted by a device such as a CMOS (Complementary MOS) or a CCD (Charge Coupled Device), and is configured to receive light that has passed through a corresponding lens 311 and to form a captured image of the subject 6. Note that, in the example in FIG. 3B, each of the image sensors 32 is configured to form a captured image of 5×5 pixels.

The lens array 31 is configured such that the lenses 311 have different optical properties. In the present embodiment, different optical properties (converging angles) are set for 15 lenses 311A, which are included in a region A that is arranged at the center, 48 lenses 311B, which are included in a region B that is set to surround the periphery of the region A, and 80 lenses 311C, which are included in a region C that is set to surround the periphery of the region B. In the following description, a letter indicating a region is appended to the reference number, e.g. "lens 311A", "lens 311B", and "lens 311C", in the case of distinguishing between the lenses arranged in the respective regions A to C, and no letter is appended, e.g. "lens 311", in the case of not distinguishing therebetween.

Specifically, in the present embodiment, the lenses 311A included in the region A have a converging angle θA of 2 degrees at most (e.g. 1 degree, 2 degrees etc.). Each of the lenses 311A corresponds to a "first transmissive unit" of the invention, and the converging angle θA corresponds to a "first converging angle" of the invention. Meanwhile, the lenses 311B and 311C included in the regions B and C have a converging angle of at least 20 degrees. Each of the lenses 311B and 311C corresponds to a "second transmissive unit" of the invention, and the converging angle of these lenses 311B and 311C corresponds to a "second converging angle" of the invention.

The lenses 311C included in the region C have a converging angle that is greater than that of the lenses 311B included in the region B. For example, the converging angle θB of the lenses 311B is set to 20 degrees, and the converging angle θC of the lenses 311C is set to 30 degrees.

Here, the converging angle is an example of an optical property, and defines the area within which a lens converges light, i.e. an imaging area of an image sensor. That is to say, the greater the converging angle of a lens, the wider the imaging area of the image sensor that corresponds to this lens. On the contrary, the smaller the converging angle of a lens, the narrower the imaging area of the image sensor that corresponds to this lens. The converging angle can be measured based on the area where a point light source is present in an image detected on the image sensor side when the point light source is moved in a predetermined direction at a specific distance from an optical element (which is the lenses 311 in the present embodiment), for example. For example, if the distance from the optical element to the point light source is L1, which is preset, and the point light source is moved by a distance L2, which is preset, from a predetermined departing point to a predetermined arrival point, while keeping the preset L1, the position at which an image indicating the point light source disappears from an image captured on the image sensor side is calculated based on L1 and L2, and the converging angle can be measured based on the calculated position. A desired converging angle of the lenses 311 can be realized by designing each lens 311 while adjusting at least any of the size, material, and shape of the lens as appropriate.

Note that the dimensions of the lenses 311 that constitute the lens array 31 need not be particularly limited, and may be determined as appropriate, depending on the embodiment. For example, the size of the lenses 311 may be determined corresponding to the image sensors 32 to be used. The size of the image sensors 32 to be used can be determined based on factors such as the size of a subject whose image is to be captured, the size of a portion of a subject that is to be identified, and the distance to a subject. The dimensions of the lenses 311 can be determined as appropriate in accordance with the thus-determined size of the image sensors 32. It is preferable to use, for each of the image sensors 32, an image sensor that has a resolution of 100 to several hundred pixels in the vertical direction and 100 to several hundred pixels in the horizontal direction, in accordance with the size of a subject and the distance to a subject. At this time, the aspect ratio of each image sensor can be determined based on the aspect ratio of a detection area.

This lens array 31 can be created as appropriate, using a known material and a known processing method. For example, the lens array 31 can be created by processing a material through which light can pass, such as a resin material or a glass material, by means of a processing method such as injection molding, cutting, or welding.

Learning Apparatus

Figure 4:
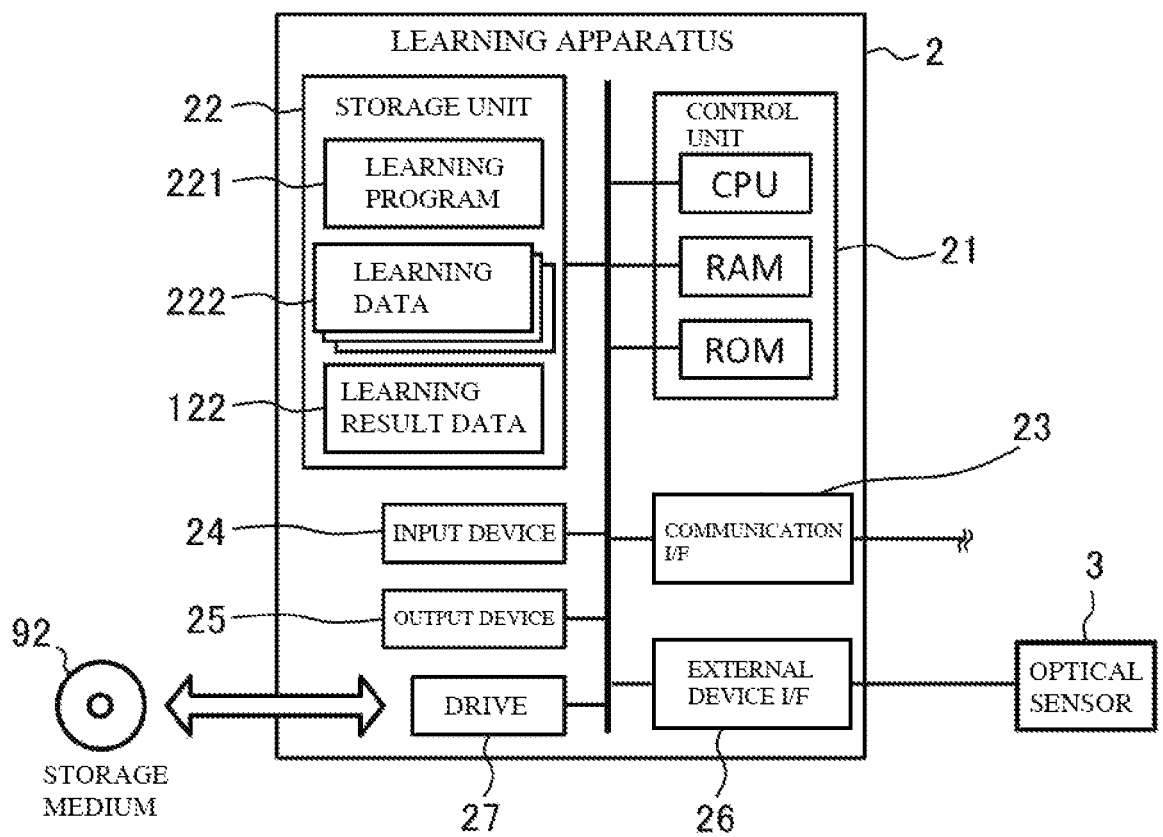
FIG. 4 schematically shows an example of a hardware configuration of the learning apparatus according to an embodiment.

Next, an example of a hardware configuration of the learning apparatus 2 according to the present embodiment will be described with reference to FIG. 4. FIG. 4 schematically shows an example of the hardware configuration of the learning apparatus 2 according to the present embodiment.

As shown in FIG. 4, the learning apparatus 2 according to the present embodiment is a computer in which a control unit 21, a storage unit 22, a communication interface 23, an input device 24, an output device 25, an external device interface 26, and a drive 27 are electrically connected to each other. Note that, in FIG. 4, the communication interface and the external device interface are denoted as a "communication I/F" and an "external device I/F", respectively, similarly to FIG. 2.

The control unit 21 to the drive 27 and a storage medium 92 are similar to the control unit 11 to the drive 17 and the storage medium 91, respectively, in the image processing apparatus 1. However, the storage unit 22 in the learning apparatus 2 stores a learning program 221, which is executed by the control unit 21, learning data 222, which is used to train the learning device, learning result data 122, which is created by executing the learning program 221, and so on.

The learning program 221 is a program for causing the learning apparatus 2 to perform later-described learning processing (FIG. 8) with a neural network. The learning data 222 is data for training the learning device to be able to analyze a predetermined attribute of the subject 6. The details thereof will be described later.

Note that the learning program 221 and/or the learning data 222 need not be stored in the storage medium 92, similarly to the image processing apparatus 1. Accordingly, the learning apparatus 2 may also acquire the learning program 221 and/or the learning data 222 to use from the storage medium 92.

Also, as for the specific hardware configuration of the learning apparatus 2, constituent elements may be omitted, replaced, or added as appropriate, depending on the embodiment, similarly to the image processing apparatus 1. Furthermore, the learning apparatus 2 may be not only an information processing apparatus that is dedicated for a service provided, but also a general-purpose server device, a desktop PC, or the like.

Functional Configuration

Image Processing Apparatus

Figure 5:
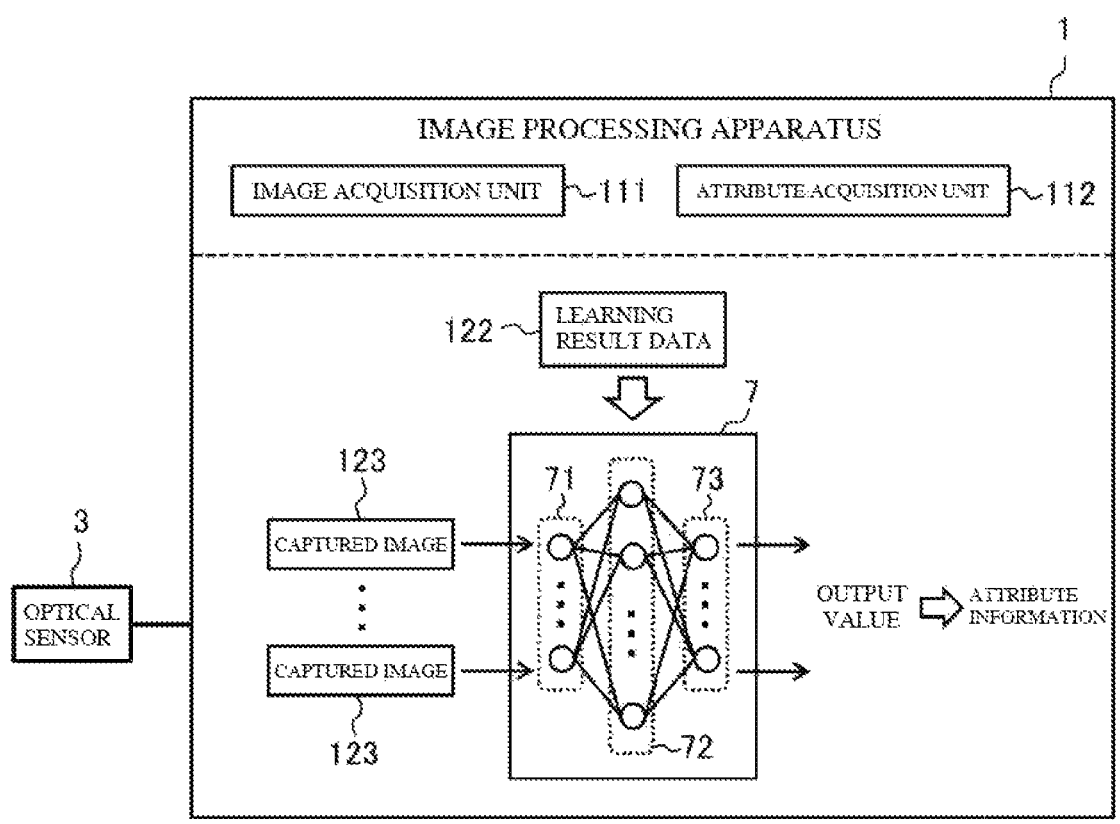
FIG. 5 schematically shows an example of a functional configuration of the image processing apparatus according to an embodiment.

Next, an example of a functional configuration of the image processing apparatus 1 according to the present embodiment will be described with reference to FIG. 5. FIG. 5 schematically shows an example of a functional configuration of the image processing apparatus 1 according to the present embodiment.

The control unit 11 in the image processing apparatus 1 loads the image processing program 121 stored in the storage unit 12 to the RAM. The control unit 11 then causes the CPU to interpret and execute the image processing program 121 loaded to the RAM, and controls the constituent elements. Thus, the image processing apparatus 1 according to the present embodiment functions as a computer that includes an image acquisition unit 111 and an attribute acquisition unit 112, as shown in FIG. 5.

The image acquisition unit 111 acquires captured images 123 formed by the image sensors 32 in the optical sensor 3, from these image sensors 32. The attribute acquisition unit 112 obtains output values from the learning device by performing calculation processing with the learning device, using the captured images 123 obtained by the image sensors 32 as the input to the learning device that has learned attributes of the subject 6. The attribute acquisition unit 112 then specifies attributes of the subject 6 based on the output values obtained from the learning device, thereby acquiring attribute information representing the attribute or attributes of the subject 6.

Next, the learning device will be described. As shown in FIG. 5, the image processing apparatus 1 according to the present embodiment uses a neural network 7 as the learning device that has learned attributes of a desired subject 6. The neural network 7 is a multi-layer neural network that is used in so-called deep learning, and includes an input layer 71, an intermediate layer (hidden layer) 72, and an output layer 73 in this order from the input side.

In FIG. 5, the neural network 7 includes one intermediate layer 72, the output from the input layer 71 serves as the input to the intermediate layer 72, and the output from the intermediate layer 72 serves as the input to the output layer 73. However, the number of intermediate layers 72 need not be limited to one, and the neural network 7 may include two or more intermediate layers 72.

Each of the layers 71 to 73 includes one or more neurons. For example, the number of neurons in the input layer 71 can be set to correspond to the number of pixels in each captured image 123. The number of neurons in the intermediate layer 72 can be set as appropriate, depending on the embodiment. The output layer 73 can be set to correspond to the number of types of attributes of the subject 6 to be analyzed.

Neurons in adjacent layers are connected to each other as appropriate, and a weight (connection weight) is set for each connection. In the example in FIG. 5, each neuron is connected to all neurons in an adjacent layer, but the connection between the neurons need not be limited to this example, and may be set as appropriate, depending on the embodiment.

A threshold is set for each neuron, and basically, the output from each neuron is determined based on whether or not the sum of the products of the input and the weight exceeds the threshold. The image processing apparatus 1 specifies attributes of the subject 6 based on output values obtained from the output layer 73 as a result of inputting the captured images 123 to the input layer 71 of this neural network 7.

Note that the learning result data 122 includes information representing the above configuration of the neural network 7 (e.g. the number of layers in the neural network 7, the number of neurons in each of the layers, the connection relationship between the neurons, transfer functions of the neurons), the connection weight between the neurons, and the thresholds for the neurons. The image processing apparatus 1 configures settings of the trained neural network 7 that is used in processing to analyze attributes of a desired subject 6, with reference to the learning result data 122.

Learning Apparatus

Figure 6:
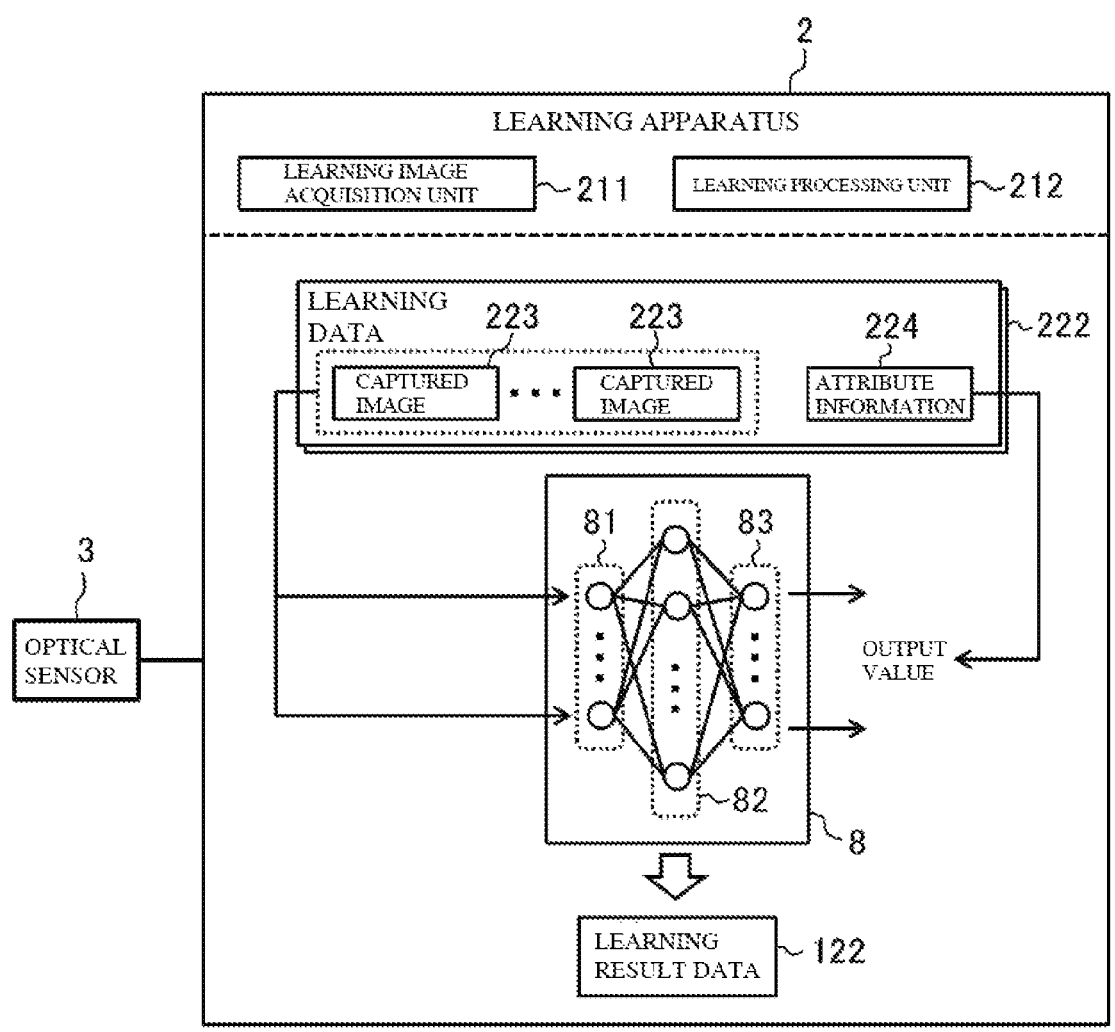
FIG. 6 schematically shows an example of a functional configuration of the learning apparatus according to an embodiment.

Next, an example of a functional configuration of the learning apparatus 2 according to the present embodiment will be described with reference to FIG. 6. FIG. 6 schematically shows an example of a functional configuration of the learning apparatus 2 according to the present embodiment.

The control unit 21 in the learning apparatus 2 loads the learning program 221 stored in the storage unit 22 to the RAM. The control unit 21 then causes the CPU to interpret and execute the learning program 221 loaded to the RAM, and controls the constituent elements. As a result, the learning apparatus 2 according to the present embodiment functions as a computer that includes a learning image acquisition unit 211 and a learning processing unit 212, as shown in FIG. 6.

The learning image acquisition unit 211 acquires, as the learning data 222, sets of a captured image 223 captured by the image sensors 32 in the optical sensor 3 and attribute information 224 indicating attributes of the subject 6 appearing in the captured image 223. The learning processing unit 212 trains, using the learning data 222, the neural network 8 to output output values corresponding to attributes of the subject 6 indicated by the attribute information 224 if the acquired captured images 223 are input thereto.

As shown in FIG. 6, in the present embodiment, the learning device to be trained is the neural network 8. The neural network 8, which is an example of the learning device, includes an input layer 81, an intermediate layer (hidden layer) 82, and an output layer 83, and is configured the same as the aforementioned neural network 7. The layers 81 to 83 are the same as the above layers 71 to 73, respectively. Through the learning processing with the neural network, the learning processing unit 212 constructs a neural network 8 that outputs output values corresponding to attributes of the subject 6 if 11×13 captured images 223 are input. The learning processing unit 212 then stores, in the storage unit 22, information representing the configuration of the constructed neural network 8, the connection weights between the neurons thereof, and the thresholds for the neurons, as the learning result data 122.

Others

Functionalities of the image processing apparatus 1 and the learning apparatus 2 will be described in detail in a later-described operational example. Note that the present embodiment has described an example in which all of the functionalities of the image processing apparatus 1 and the learning apparatus 2 are realized by a general-purpose CPU. However, some or all of the above functionalities may alternatively be realized by one or more dedicated processors. As for the functional configurations of the image processing apparatus 1 and the learning apparatus 2, functionalities may be omitted, replaced, and added as appropriate, depending on the embodiment.

§ 3 Operational Example

Image Processing Apparatus

Figure 7:
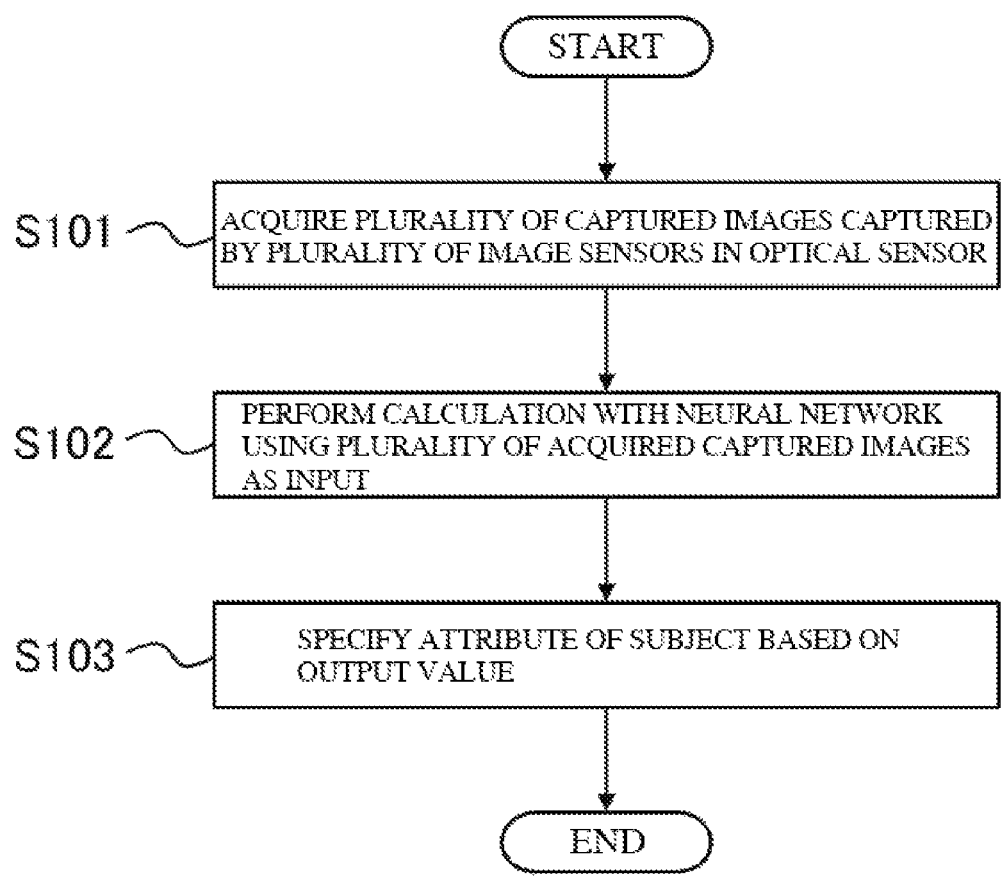
FIG. 7 shows an example of a processing procedure of the image processing apparatus according to an embodiment.

Next, an operational example of the image processing apparatus 1 will be described with reference to FIG. 7. FIG. 7 is a flowchart that illustrates an example of a processing procedure of the image processing apparatus 1. Note that the processing procedure described below is merely an example, and each process may be altered to the extent possible. As for the processing procedure described below, steps may be omitted, replaced, and added as appropriate, depending on the embodiment.

Start

First, a user starts the image processing apparatus 1, and causes the started image processing apparatus 1 to execute the image processing program 121. The control unit 11 in the image processing apparatus 1 references the learning result data 122, and configures settings of the configuration of the neural network 7, the connection weights between the neurons thereof, and the thresholds for the neurons. The control unit 11 then analyzes attributes of the subject 6 in accordance with the following processing procedure.

Step S101

In step S101, the control unit 11 functions as the image acquisition unit 111, and acquires captured images 123 that are captured by the image sensors 32, from the image sensors 32 in the optical sensor 3 that is connected via the external device interface 16. In the present embodiment, since the optical sensor 3 includes 11×13 image sensors 32, in step S101, basically, the control unit 11 acquires 11×13 captured images 123 every time image capturing is performed.

Step S102

In the next step S102, the control unit 11 functions as the attribute acquisition unit 112, and obtains output values from the neural network 7 by performing calculation processing with the neural network 7 using the captured images 123 acquired in step S101 as the input to the neural network 7.

For example, the control unit 11 inputs pixel values of the images included in the acquired 11×13 captured images 123 to the neurons included in the input layer 71 of the neural network 7. The correspondence relationship between the pixel values and the neurons may be set as appropriate, depending on the embodiment. Next, the control unit 11 determines, in the feed-forward direction, whether or not each of the neurons included in the layers 71 to 73 has fired. Thus, the control unit 11 can obtain an output value from each of the neurons included in the output layer 73 in the neural network 7.

Step S103

In the next step S103, the control unit 11 functions as the attribute acquisition unit 112, and acquires attribute information representing attributes of the subject 6 by specifying the attributes of the subject 6 based on the output values obtained from the neural network 7 in step S102.

As mentioned above, the neural network 7 has already been trained to output output values corresponding to desired attributes of the subject 6 of a desired type if the captured images 123 obtained from the image sensors 32 in the optical sensor 3 are input. Also, the same number of output values as the number of neurons included in the output layer 73 can be obtained, and one or more of the obtained output values may be associated with one attribute (attribute value) of the subject 6. Information representing the correspondence relationship between attributes (attribute values) of the subject 6 and output values of the neural network 7 may be given by data in a table form or the like.

The control unit 11 specifies attributes (attribute values) of the subject 6 based on the output values obtained in step S102, by referencing the information representing the correspondence relationship between attributes (attribute values) of the subject 6 and output values of the neural network 7. The number of attributes of the subject 6 to be specified may be selected as appropriate, depending on the embodiment. The control unit 11 can thus acquire attribute information representing the attributes of the subject 6. The control 11 outputs the acquired attribute information to the output device 15 and then ends the processing to analyze the subject 6 according to this operational example, for example. Here, the attribute information refers to some kind of information that may characterize the subject, which may include the position, orientation, shape, size, color, type, and a surrounding situation of the subject, and may include an image that depicts the subject itself.

Note that the attributes of the subject 6 to be specified need not be particularly limited as long as they are characteristics of the subject 6 that may appear in the captured images 123, and may be selected as appropriate, depending on the embodiment. The control unit 11 may acquire, as the attribute information, one of, or a combination of the position, direction, orientation, size, shape, motion, type, individual identification information, color, brightness, and environmental information of the subject 6, for example. The individual identification information is information for identifying a subject (individual, substance) of the same type or a different type, and may be a serial number, an identifier, or the like, for example. The environmental information is information representing the subject and a surrounding situation thereof, and may include, for example, information representing the degree of brightness around the subject, background colors, and distributions of the brightness and the background colors. If a subject that is present outdoors is to be analyzed, the environmental information may also include weather information.

Here, in the present embodiment, the lens array 31 is configured such that the converging angle θA of the lenses 311A included in the region A arranged at the center is 2 degrees or smaller, and the converging angles θB and OC of the lenses 311B and 311C included in the regions B and C arranged so as to surround the periphery of the region A are at least 20 degrees.

Due to this configuration, a subject 6 that is present at positions corresponding to the lenses 311A, i.e. a subject 6 that is present in a relatively narrow area in front of the optical sensor 3 appears at high resolution in the captured images 123 obtained from the image sensors 32 that correspond to the lenses 311A. On the other hand, a subject 6 that is present not only at positions corresponding to the lenses 311B, 311C but also positions that are relatively far away from these positions appears at low resolution in the captured images 123 obtained from the image sensors 32 that correspond to the lenses 311B, 311C.

Accordingly, the plurality of captured images 123 obtained from the image sensors 32 that correspond to the lenses 311A are suitable for analyzing the type of a subject 6 that is preset in front of the optical sensor 3. Meanwhile, the plurality of captured images 123 obtained from the image sensors 32 that correspond to the lenses 311B and 311C are suitable for analyzing physical characteristics, such as the position, direction, orientation, size, shape, and motion, of a subject 6 that is present in front of the optical sensor 3 and a subject 6 that is present at a position further away from the front of the optical sensor 3.

For this reason, in the present embodiment, the neural network 7 may also be configured to output the type of a subject 6 that is present in front of the optical sensor 3, and physical characteristics of a subject 6 that is present in front of the optical sensor 3 and a subject 6 that is present at a position away from the front of the optical sensor 3. In this case, in step S103, the control unit 11 can acquire, as the attribute information, information representing the type of a subject 6 that is present in front of the optical sensor 3, and physical characteristics of a subject 6 that is present at a position away from the front of the optical sensor 3, based on the output values of the neural network 7.

Such analysis of the subject 6 can be utilized in the case of watching the situation in front of a vehicle, such as an automobile, for example. That is to say, the optical sensor 3 may be installed so as to capture images of the situation in front of the vehicle, and the image processing apparatus 1 may analyze attributes of a subject 6 based on the captured images 123 obtained by this optical sensor 3. Thus, the image processing apparatus 1 can acquire, as the attribute information, information representing the type of a subject 6 that is present in front of the optical sensor 3, i.e. in front of the vehicle, and physical characteristics of a subject 6 that is present around the front of the vehicle. Information representing the type of a subject 6 that is present in front of the vehicle can be used to determine whether or not any obstacle to be watched is present in front of the vehicle. Information representing physical characteristics of a subject 6 that is present around the front of the vehicle can be used to determine whether or not any object is present that may rush out of the surroundings to the front of the vehicle. The image processing apparatus 1 can control autonomous driving of the vehicle based on the determination results.

Learning Apparatus

Figure 8:
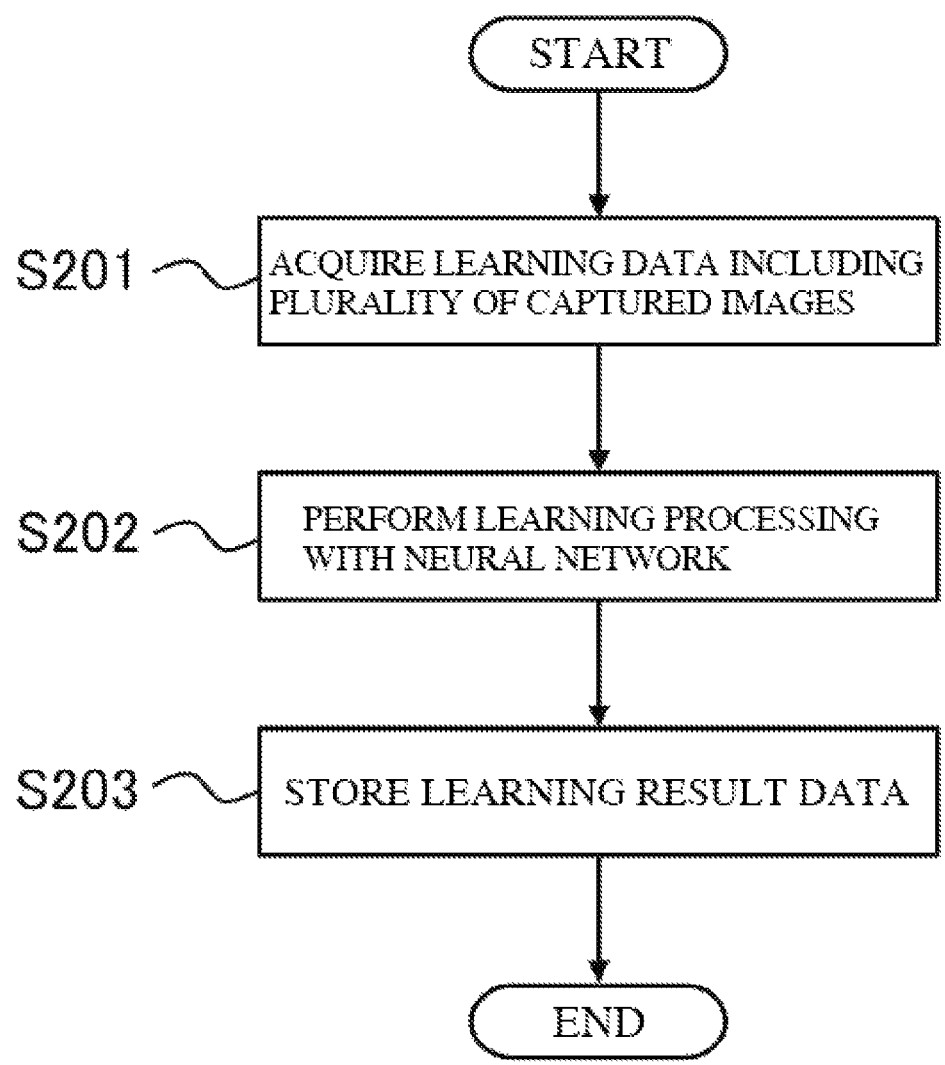
FIG. 8 shows an example of a processing procedure of the learning apparatus according to an embodiment.

Next, an operational example of the learning apparatus 2 will be described with reference to FIG. 8. FIG. 8 is a flowchart that illustrates an example of a processing procedure of the learning apparatus 2. Note that the processing procedure described below is merely an example, and each process may be altered as much as possible. As for the processing procedure described below, steps may be omitted, replaced, and added as appropriate, depending on the embodiment.

Step S201

In step S201, the control unit 21 functions as the learning image acquisition unit 211, and acquires, as the learning data 222, pairs of the captured images 223 captured by the image sensors 32 in the optical sensor 3 and the attribute information 224 indicating attributes of the subject 6 that appears in the captured images 223.

The learning data 222 is data for training the neural network 8 to be able to analyze attributes of a desired subject 6. This learning data 222 can be created by, for example, capturing images of a prepared subject 6 using the optical sensor 3 under various conditions, and associating the obtained captured images with the imaging conditions.

Specifically, the control unit 21 causes the optical sensor 3 to capture images of the subject 6 in a state where attributes to be analyzed appear. The control unit 21 can thus acquire a plurality of captured images 223 of the subject 6 in which the attributes to be analyzed appear, from the image sensors 32 in the optical sensor 3. In the present embodiment, since the optical sensor 3 includes 11×13 image sensors 32, the control unit 21 can acquire 11×13 captured images 223 every time image capturing is performed once. The control unit 21 can then create the learning data 222 by accepting, as appropriate, the input of the attribute information 224 (i.e. training data) indicating the attributes of the subject 6 that appears in the captured images 223, and associating the input attribute information 224 with the capture images 223. This learning data 222 may be created manually using the input device 24 by an operator or the like, or may be created automatically by a robot or the like.

Note that the learning data 222 may be created by the learning apparatus 2 as described above, or may be created by an information processing apparatus other than the learning apparatus 2. If the learning apparatus 2 creates the learning data 222, in step S201, the control unit 21 can acquire the learning data 222 by performing processing to create the learning data 222. On the other hand, if an information processing apparatus other than the learning apparatus 2 creates the learning data 222, the learning apparatus 2 can acquire the learning data 222 created by the other image processing apparatus, via a network, the storage medium 92, or the like. The number of pieces of learning data 222 acquired in step S201 may be determined as appropriate, depending on the embodiment, such that the neural network 8 can be trained.

Step S202

In the next step S202, the control unit 21 functions as the learning processing unit 212, and trains the neural network 8 to output output values corresponding to the attributes of the subject 6 indicated by the attribute information 224 if the captured images 223 are input, using the learning data 222 acquired in step S201.

Specifically, first, the control unit 21 prepares the neural network 8 with which learning processing is to be performed. The configuration of the neural network 8 to be prepared, initial values of the connection weights between the neurons thereof, and initial values of the thresholds for the neurons may be given by a temple, or may be input by an operator. In the case of performing relearning, the control unit 21 may prepare the neural network 8 based on the learning result data 122 with which relearning is to be performed.

Next, the control unit 21 trains the neural network 8 using the captured images 223 included in the learning data 222 acquired in step S201 as input data, and the attribute information 224 as training data. The gradient descent method, the stochastic gradient descent method, or the like may be used to train the neural network 8 here.

For example, the control unit 21 performs calculation processing in the feed-forward direction with the neural network 8, using pixel values of the captured images 223 as the input to the input layer 81. The control unit 21 thus obtains output values output from the output layer 83 of the neural network 8. Next, the control unit 21 calculates errors between the output values output from the output layer 83 and desired values that correspond to the attributes indicated by the attribute information 224. Subsequently, the control unit 21 calculates errors in the connection weights between the neurons and the thresholds for the neurons using the calculated errors in the output values, by means of the back propagation method. The control unit 21 then updates the values of the connection weights between the neurons and the thresholds for the neutrons, based on the calculated errors.

The control unit 21 trains the neural network 8 by repeating, for each piece of the learning data 222, the above series of processing until the output values output from the neural network 8 match the desired values corresponding to the attributes indicated by the attribute information 224. Thus, a neural network 8 can be constructed that outputs output values corresponding to the attributes indicated by the attribute information 224 if the captured images 223 are input.

Step S203

In the next step S203, the control unit 21 functions as the learning processing unit 212, and stores, in the storage unit 22, information representing the configuration of the constructed neural network 8, the connection weights between the neurons, and the thresholds for the neurons, as the learning result data 122. The control unit 21 thus ends the learning processing with the neural network 8 according to this operational example.

Note that, after finishing the processing in the aforementioned step S203, the control unit 21 may also transfer the created learning result data 122 to the image processing apparatus 1. The control unit 21 may also regularly update the learning result data 122 by regularly performing the learning processing in the aforementioned steps S201 to S203. The control unit 21 may then regularly update the learning result data 122 held by the image processing apparatus 1, by transferring the created learning result data 122 to the image processing apparatus 1 every time the learning processing is performed.

Effects

As described above, in the present embodiment, in the aforementioned step S101, a plurality of captured images 123 in which the subject 6 appears can be acquired in a state where different optical properties are reflected, using the lens array 31. Then, through the aforementioned steps S102 and S103, the plurality of captured images 123 are input to the neural network 7, and attributes of the subject 6 are specified based on output values obtained from the neural network 7. In the learning part as well, a plurality of captured images 223 in which the subject 6 appears are acquired in a state where different optical properties are reflected, and the neural network 8 is trained using the plurality of captured images 223.

That is to say, in the present embodiment, analysis suitable for a plurality of different attributes of the subject 6 is enabled by using a plurality of captured images (123, 223) in which the subject 6 appears in a state where different optical properties are reflected, as the input to the neural networks (7, 8). For example, in the present embodiment, the lens array 31 is provided with the region A in which the lenses 311A with a small converging angle are arrange, and the regions (B, C) in which the lenses 311B and 311C with a large converging angle are arranged. Thus, captured images 123 suitable for specifying the type of the subject 6 can be obtained from the image sensors 32 corresponding to the region A. Meanwhile, captured images 123 suitable for specifying physical characteristics of the subject 6 can be obtained from the image sensors 32 corresponding to the regions (B, C). Accordingly, according to the present embodiment, a variety of attributes of the subject 6 can be identified.

§ 4 Example Modifications

Although the present embodiment of the invention has been described in detail, the above description is merely an example of the invention in all respects. Needless to say, various improvements and modifications can be made without departing from the scope of the invention. For example, the following alterations are possible. Note that, in the following description, the same reference numerals are used for the same constituent elements in the above embodiment, and descriptions of the same points as those in the above embodiment are omitted. The following example modifications can be combined as appropriate.

4.1

For example, in the above embodiment, general feedforward neural networks that have a multi-layer structure are used as the neural networks (7, 8), as shown in FIGS. 5 and 6. However, the type of the neural networks (7, 8) need not be limited to this example, and may be selected as appropriate, depending on the embodiment. For example, the neural networks (7, 8) may also be convolutional neural networks that use the input layer 71 and the intermediate layer 72 as a convolutional layer and a pooling layer. Also, for example, the neural networks (7, 8) may also be recurrent neural networks with connections that recur from the output side to the input side, e.g. from the intermediate layer 72 to the input layer 71. Note that the number of layers of each of the neural networks (7, 8), the number of neurons in each layer thereof, the connection relationship between the neurons, and transfer functions of the neurons may be determined as appropriate, depending on the embodiment.

4.2

In the above embodiment, the image processing apparatus 1 that analyzes attributes of the subject 6 and the learning apparatus 2 that trains the learning device (neural network) are constituted by separate computers. However, the configurations of the image processing apparatus 1 and the learning apparatus 2 need not be limited to this example, and a system that has the functionalities of both the image processing apparatus 1 and the learning apparatus 2 may be realized by one or more computers.

4.3

In the above embodiment, the learning devices are constituted by neural networks. However, the type of the learning devices need not be limited to neural networks as long as a plurality of captured images 123 obtained from the image sensors 32 can be used as the input, and may be selected as appropriate, depending on the embodiment. Examples of learning devices to which a plurality of captured images 123 can be input may include not only the aforementioned neural networks, but also learning devices that are trained using a support vector machine, a self-organizing map, or reinforcement learning.

4.4

For example, in the above embodiment, the converging angle is described as an example of the optical properties that differ between the lenses 311. However, the type of the optical property that differs between the lenses 311 need not be limited to the converging angle, and may be selected as appropriate, depending on the embodiment. The optical properties include not only the converging angle but also the refractive index, the band of light that passes through the lenses 311, and the like. The refractive index can be realized by designing the lenses 311 while adjusting at least one of the size, material, and shape of the lenses 311. The band of light that passes through the lenses 311 can be realized by designing the lenses 311 while adjusting at least one of the material and color of the lenses 311. 4.5

For example, in the present embodiment, the lens array 31 is configured such that the converging angle θA of the lenses 311A included in the region A arranged at the center serves as a predetermined first converging angle and is 2 degrees at most, and each of the converging angles θB and θC of the lenses 311B and 311C included in the regions B and C arranged so as to surround the periphery of the region A serves as a second converging angle and is at least 20 degrees. However, the optical properties of the lenses 311 (each of which is a transmissive unit) need not be limited to this example, and may be set as appropriate, depending on the embodiment. That is to say, the predetermined first converging angle may be determined as appropriate, depending on the embodiment. The second converging angle need only be greater than the first converging angle, and may be determined as appropriate, depending on the embodiment.

The converging angle θA of the lenses 311A need not be set as the first converging angle, and each of the converging angles θB and θC of the lenses 311B and 311C need not be set as the second converging angle. For example, a configuration may be employed in which the converging angle of the lenses included in the region C arranged on the outermost side is smallest, and the converging angle of the lenses increases from the region C toward the region B and the region A, and then toward the center. This configuration makes it possible to readily identify the type of a subject 6 that is present around the front of the optical sensor 3.

Figure 9:
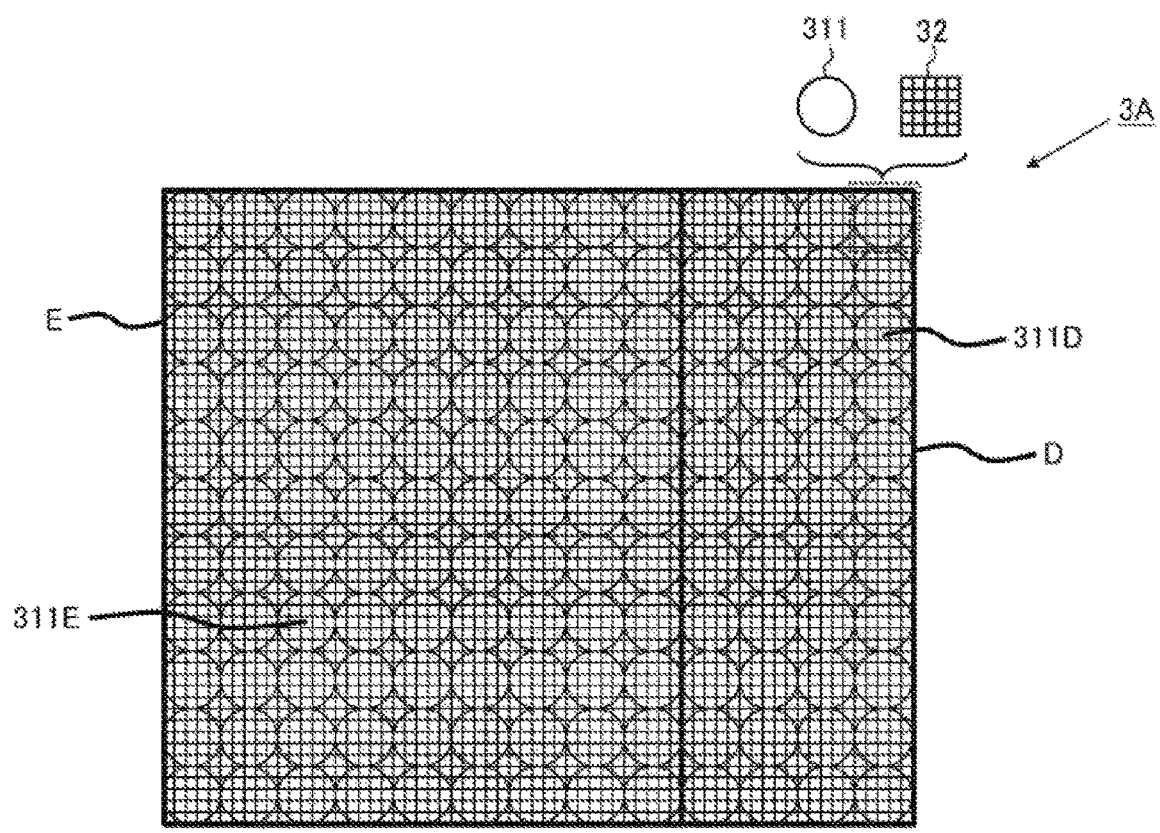
FIG. 9 schematically shows an example of a configuration of an optical sensor according to an example modification.

Lenses with a small converging angle may be arranged in the direction in which the type of the subject 6 is identified, as shown as an example in FIG. 9. FIG. 9 schematically shows an example of the optical sensor 3A according to this example modification as seen from the front. As shown as an example in FIG. 9, the lens array according to this example modification is divided into a right region D and a left region E, and can be configured such that 11×4 lenses 311D included in the region D have a converging angle different from that of 11×9 lenses 311E included in the region E.

For example, in the case of identifying the type of a subject 6 using captured images obtained through the lenses 311D on the right side, the converging angle of the lenses 311D may be made smaller than the converging angle of the lenses 311E. In this case, the converging angle of the lenses 311D may be set to 2 degrees at most (e.g. 1 degree, 2 degrees etc.), and the converging angle of the lenses 311E may be set to at least 20 degrees (e.g. 20 degrees, 30 degrees etc.). Meanwhile, in the case of identifying the type of a subject using captured images obtained through the lenses 311E on the left side, the aforementioned converging angles of the lenses 311D and the lenses 311E may be reversed.

By thus making the converging angle of the lenses (transmissive units) arranged in a direction in which the type of a subject 6 is to be identified, identification of the type of the subject 6 that is present in this direction can be facilitated. With this configuration, in the case of the aforementioned autonomous driving, arranging lenses with a small converging angle (e.g. 1 degree, 2 degrees etc.) in a direction in which an obstacle entering a path in which the vehicle is traveling is watched makes it possible to readily identify the type of the obstacle that is proceeding from this direction and control autonomous driving based on the identification result, for example.

For example, the optical properties of at least some of the lenses 311 (transmissive units) may be irregular. This configuration makes it possible to obtain, from the optical sensor 3, a plurality of captured images in which a variety of optical properties are reflected, and facilitate identification of a variety of attributes of the subject 6. For example, the optical properties of at least some of the plurality of transmissive units can be made irregular by randomly setting the optical properties of the transmissive units. In the case of using the lens array 31 as an optical member, for example, optical properties, such as the converging angle (area), directivity, and the distance between lenses, can be set so as to differ between at least any of adjacent lenses 311 by differentiating the size, material, shape, color, and the like of the lenses 311 (transmissive units) that constitute the lens array 31. The optical properties of at least some of the plurality of transmissive units being irregular refers to the aforementioned state where any of adjacent transmissive units have different optical properties. However, the area where optical properties are irregular need not be limited to a portion of the optical member, and may alternatively be the entire optical member. For example, the optical properties of all of the lenses 311 may be made irregular by randomly setting the optical properties over the entire lens array 31. The aforementioned optical member in which the optical properties of at least some of the transmissive units are irregular can also be constituted by a member other than a lens array. For example, by providing irregular recesses and projections or grooves on a surface of an optical member of a ground-glass type, the optical properties can be irregularly set within the area where the recesses and projections or grooves are provided.

Note that, in the above embodiment, 15 lenses 311A are included in the region A, 48 lenses 311B are included in the region B, and 80 lenses 311C are included in the region C. The region A has a rectangular shape, and the region B and the region C have a hollow rectangular shape from which the region A and the region B are excluded, respectively. However, the number of lenses 311 included in each of the regions A to C and the shape of each of the regions A to C (i.e. the arrangement and shape of the lenses 311) need not be limited to those in this example, and may be set as appropriate, depending on the embodiment.

4.6

For example, in the above embodiment, the lens array 31 includes 11>13 lenses 311, and the optical sensor 3 includes 11>13 image sensors 32 correspondingly. However, the number of lenses 311 included in the lens array 31 and the number of image sensors 32 need not be limited to those in this example, and may be selected as appropriate, depending on the embodiment. In addition, the lenses 311 and the image sensors 32 need not correspond to each other in a one-to-one manner.

For example, in the above embodiment, each of the image sensors 32 is configured to form a captured image of 5×5 pixels. However, the number of pixels of a captured image formed by each of the image sensors 32 need not be limited to this example, and may be set as appropriate, depending on the embodiment. In addition, the number of pixels of the image sensors 32 may differ.

4.7

For example, in the above embodiment, a lens array is used as an example of the optical member that refracts light from a subject. However, the type of the optical member need not be limited to a lens array, and may be selected as appropriate, depending on the embodiment. For example, the optical member may include not only a lens array, but also at least any of a diffraction grating, a scattering lens, and a holographic lens. Also, the optical member need not be of a lens type, and may alternatively be an optical member that causes light that passes therethrough to irregularly enter the image sensors, e.g. a ground-glass plate. Here, for example, if the optical member is a diffraction grating, a scattering lens, or a holographic lens, a portion that causes light to enter one image sensor serves as a transmissive unit. That is to say, ordinarily, a diffraction grating, a scattering lens, and a holographic lens are formed into a flat plate shape, and an optical member with such a flat plate shape will include a plurality of transmissive units corresponding to the image sensors that receive light through this optical member. In this case, the optical member may be designed such that the transmissive units provided in correspondence with the image sensors have different optical properties.

For example, in the case of a diffraction grating, optical properties of the transmissive units can be differentiated by irregularly providing elements for diffracting and/or refracting light, such as recesses and projection or grooves, in the transmissive units. In the case of a scattering lens, the shape or the like of the transmissive units can be designed so as to differentiate the direction in which light is scattered. In the case of a holographic lens, optical properties can be made irregular by designing the holographic lens such that irregular interference of light occurs by differentiating optical properties between portions of the holographic lens, which is designed such that interference occurs in accordance with the wavelength of light.

4.8

For example, in the aforementioned step S103, the control unit 11 may also create an image depicting the subject 6 based on the output from the neural network 7, and output the created image as the attribute information. In this case, an image captured by an ordinarily camera that does not include a lens array can be used as the attribute information 224 (training data) for learning. That is to say, in the aforementioned step S201, an ordinary camera is arranged at substantially the same position as the position of the optical sensor 3. When an image of the subject 6 is captured by the optical sensor 3, an image of the subject 6 is also captured by this camera. Thus, the learning data 222 can be created by using the captured image obtained by the camera as the attribute information 224 and associating this captured image with the plurality of captured images 223 obtained by the optical sensor 3. A figure of the subject 6 can appear in a state where some of the features that the subject 6 has are lacking, in the image rendered based on the output from the neural network 7. For example, if the subject 6 is a person, an image in which this person appears with details of the face thereof lacking can be obtained. Thus, the output can be made while giving consideration to privacy.

4.9

For example, the above image processing apparatus 1 may also be configured to hold a plurality of pieces of learning result data 122, and to be able to switch the neural network 7 to be used, in accordance with a designation by a user. In this case, the image processing apparatus 1 may acquire each piece of learning result data 122 from the learning apparatus 2 via the network 10, or may acquire each piece of learning result data 122 via from the storage medium 91 via the drive 17, in accordance with an operation of the input device 14 performed by the user. Also, the image processing apparatus 1 may also acquire each piece of learning result data 122 by accepting distribution thereof from the learning apparatus 2. Furthermore, each piece of learning result data 122 may also be stored in anther information processing apparatus (storage device), such as a NAS (Network Attached Storage), and the image processing apparatus 1 may acquire each piece of learning result data 122 by accessing the other information processing apparatus.

INDEX TO THE REFERENCE NUMERALS

1 . . . Image processing apparatus (Information processing apparatus), 100 . . . Image processing system, 11 . . . Control unit, 12 . . . Storage unit, 13 . . . Communication interface, 14 . . . Input device, 15 . . . Output device, 16 . . . External device interface, 17 . . . Drive, 111 . . . Image acquisition unit, 112 . . . Attribute acquisition unit, 121 . . . Image processing program, 122 . . . Learning result data, 123 . . . Captured image, 2 . . . Learning apparatus, 21 . . . Control unit, 22 . . . Storage unit, 23 . . . Communication interface, 24 . . . Input device, 25 . . . Output device, 26 . . . External device interface, 27 . . . Drive, 211 . . . Learning image acquisition unit, 212 . . . Learning processing unit, 221 . . . Learning program, 222 . . . Learning data, 223 . . . Captured image, 224 . . . Attribute information, 3 . . . Optical sensor, 31 . . . Lens array (Optical member), 311, 311A, 311B, 311C . . . Lens (Transmissive unit), 32 . . . Image sensor, 6 . . . Subject, 7 . . . Neural network, 71 . . . Input layer, 72 . . . Intermediate layer (Hidden layer), 73 . . . Output layer, 8 . . . Neural network, 81 . . . Input layer, 82 . . . Intermediate layer (Hidden layer), 83 . . . Output layer, 91, 92 . . . Storage medium

The invention claimed is:

1. An image processing system comprising:
an optical sensor comprising: an optical member configured to refract light from a subject, the optical member comprising a plurality of transmissive units that have different optical properties, thus forming different refraction patterns of light that passes therethrough; and a plurality of image sensors configured to receive light that has passed through the transmissive units and to form captured images in which the subject appears, the plurality of image sensors being provided in correspondence with the transmissive units; and
a processor configured with a program to perform operations comprising operation as an information processing apparatus configured to acquire attribute information representing an attribute of the subject by inputting the captured images obtained by the image sensors to a trained learning device that has been trained to determine the attribute of the subject, wherein
the plurality of transmissive units in the optical member comprise a plurality of first transmissive units arranged at a center of the plurality of transmissive units in a rectangular shape and that have a predetermined first converging angle, and second transmissive units that are arranged forming edges of a hollow rectangular shape so as to surround a periphery of the plurality of first transmissive units and that have a second converging angle that is greater than the first converging angle.

2. The image processing system according to claim 1, wherein the first converging angle is 2.0 degrees at most, and the second converging angle is at least 20 degrees.

3. The image processing system according to claim 1, wherein the learning device is constituted by a learning device that is trained using a neural network, a support vector machine, a self-organizing map, or reinforcement learning.

4. The image processing system according to claim 1, wherein the optical member comprises at least one of a lens array comprising a plurality of lenses, a diffraction grating, a scattering lens, and a holographic lens.

5. The image processing system according to claim 1, wherein
the optical member comprises a lens array comprising a plurality of lenses as the plurality of transmissive units, and
the optical properties of the transmissive units are realized by at least one of a size, a material, a shape, and a color of the lenses.

6. The image processing system according to claim 1, wherein the processor is configured with the program to perform operations such that operation as the information processing apparatus further comprises outputting, as the attribute information, one of, or a combination of, a position, a direction, an orientation, a size, a shape, a motion, a type, individual identification information, a color, a brightness, and environmental information of the subject.

7. The image processing system according to claim 1, wherein the processor is configured with the program to perform operations such that operation as the information processing apparatus further comprises creating an image depicting the subject based on output from the learning device, and outputting the created image as the attribute information.

8. An image processing system comprising:
an optical sensor comprising: an optical member configured to refract light from a subject, the optical member comprising a plurality of transmissive units that have different optical properties, thus forming different refraction patterns of light that passes therethrough; and a plurality of image sensors configured to receive light that has passed through the transmissive units and to form captured images in which the subject appears, the plurality of image sensors being provided in correspondence with the transmissive units; and
an information processing apparatus configured to acquire attribute information representing an attribute of the subject by inputting the captured images obtained by the image sensors to a trained learning device that has been trained to determine the attribute of the subject, wherein the optical properties of the plurality of transmissive units are irregular, and the plurality of transmissive units in the optical member comprises a plurality of first transmissive units arranged at a center of the plurality of transmissive units in a rectangular shape and that have a predetermined first converging angle, and second transmissive units that are arranged forming edges of a hollow rectangular shape so as to surround a periphery of the plurality of first transmissive units and that have a second converging angle that is greater than the first converging angle.

9. An optical sensor comprising:

an optical member configured to refract light from a subject, the optical member comprising a plurality of transmissive units that have different optical properties, thus forming different refraction patterns of light that passes therethrough; and a plurality of image sensors configured to receive light that has passed through the transmissive units and to form captured images in which the subject appears, the plurality of image sensors being provided in correspondence with the transmissive units, wherein the plurality of transmissive units in the optical member comprise a plurality of first transmissive units arranged at a center of the plurality of transmissive units in a rectangular shape and have a predetermined first converging angle, and second transmissive units that are arranged forming edges of a hollow rectangular shape so as to surround a periphery of the plurality of first transmissive units and have a second converging angle that is greater the first converging angle.

10. The optical sensor according to claim 9, wherein the first converging angle is 2.0 degrees at most, and the second converging angle is at least 20 degrees.

11. The optical sensor according to claim 9, wherein the optical member comprises at least one of a lens array comprising a plurality of lenses, a diffraction grating, a scattering lens, and a holographic lens.

12. The optical sensor according to claim 9, wherein the optical member comprises a lens array comprising a plurality of lenses as the plurality of transmissive units, and the optical properties of the transmissive units are realized by at least one of a size, a material, a shape, and a color of the lenses.

13. A learning apparatus comprising a processor configured with a program to perform operations comprising:

operation as a learning image acquisition unit configured to acquire the captured images captured by the image sensors from the optical sensor according to claim 9; and operation as a learning processing unit configured to train a learning device to output attribute information regarding the subject in response to the acquired captured images being input.

14. The learning apparatus according to claim 13, wherein the processor is configured with the program such that operation as the learning processing unit further comprises training the learning device to output, as the attribute information, one of, or a combination of, a position, a direction, an orientation, a size, a shape, a motion, a type, individual identification information, a color, a brightness, environmental information of the subject, and an image depicting the subject.

15. An optical sensor comprising:

an optical member configured to refract light from a subject, the optical member comprising a plurality of transmissive units that have different optical properties, thus forming different refraction patterns of light that passes therethrough; and a plurality of image sensors configured to receive light that has passed through the transmissive units and to form captured images in which the subject appears, the plurality of image sensors being provided in correspondence with the transmissive units, wherein the optical properties of the transmissive units are irregular; and the plurality of transmissive units in the optical member comprises a plurality of first transmissive units arranged at a center of the plurality of transmissive units in a rectangular shape and that have a predetermined first converging angle, and second transmissive units that are arranged forming edges of a hollow rectangular shape so as to surround a periphery of the plurality of first transmissive units and that have a second converging angle that is greater than the first converging angle.

* * * * *